United States Patent

Kolman et al.

(10) Patent No.: US 9,501,731 B2
(45) Date of Patent: Nov. 22, 2016

(54) MULTI-FREQUENCY TRANSPONDER

(71) Applicant: EM Microelectronic-Marin S.A., Marin (CH)

(72) Inventors: Jiri Kolman, Prague (CZ); Jan Kubis, Prague (CZ); James Springer, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 14/677,174

(22) Filed: Apr. 2, 2015

(65) Prior Publication Data

US 2016/0292557 A1 Oct. 6, 2016

(51) Int. Cl.
*G06K 19/06* (2006.01)
*G06K 19/07* (2006.01)

(52) U.S. Cl.
CPC .................. *G06K 19/0723* (2013.01)

(58) Field of Classification Search
CPC ........ G06K 19/06; G06K 19/00; G06K 7/08; G06K 5/00; G06F 17/00
USPC .......... 235/492, 380, 487, 375, 451
See application file for complete search history.

(56) References Cited

U.S. PATENT DOCUMENTS

| | | | |
|---|---|---|---|
| 8,500,033 B2 | 8/2013 | Almond et al. | |
| 2001/0003445 A1* | 6/2001 | Gauther | G06K 19/07 345/87 |
| 2004/0089707 A1* | 5/2004 | Cortina | G06K 19/0723 235/375 |
| 2004/0263319 A1* | 12/2004 | Huomo | G06K 19/0716 340/10.2 |
| 2005/0052283 A1* | 3/2005 | Collins | G06K 19/07767 340/572.7 |
| 2007/0279286 A1* | 12/2007 | Coutts | H01Q 9/0407 343/700 MS |
| 2008/0122584 A1* | 5/2008 | Itasaki | G06K 19/0723 340/10.51 |
| 2008/0238679 A1* | 10/2008 | Rofougaran | G06K 7/0008 340/572.2 |
| 2011/0273273 A1* | 11/2011 | Liu | G06K 19/0724 340/10.1 |
| 2012/0206243 A1 | 8/2012 | Butler et al. | |
| 2012/0261479 A1* | 10/2012 | Moore | G06K 7/0008 235/492 |
| 2013/0146669 A1 | 6/2013 | Almond et al. | |
| 2014/0157391 A1* | 6/2014 | Choi | H04W 12/06 726/9 |

FOREIGN PATENT DOCUMENTS

CN 203102345 U * 7/2013
TW 201129928 A * 9/2011

OTHER PUBLICATIONS

European Search Report issued Sep. 7, 2015 in Patent Application No. 15 162 492.1.

* cited by examiner

*Primary Examiner* — Edwyn Labaze
(74) *Attorney, Agent, or Firm* — Oblon, McClelland, Maier & Neustadt, L.L.P.

(57) ABSTRACT

The invention concerns a multi-frequency transponder for communicating at a first frequency according to a first communication protocol and at a second different frequency according to a second communication protocol. The transponder comprises a first physical memory for storing a first data of the first communication protocol; a second physical memory for storing a second data, different from the first data, of the second communication protocol; and a logic unit for accessing the first and second physical memories. The logic unit comprises a first control unit for handling communications according to the first protocol, and a second control unit for handling communications according to the second protocol. The transponder comprises a mapping memory to store a logical memory map of the first or second physical memories. The logical memory map comprises mapping information for the first or second control unit to access data items in first and second physical memories.

16 Claims, 3 Drawing Sheets

Fig. 3

| Memory Bank | Word Adress | Content | Memory Type |
|---|---|---|---|
| RESERVED | 0 | ... | NVM_UHF |
|  | 1 | ... |  |
|  | 2 | ... |  |
|  | 3 |  |  |
| EPC | 0 | ... | NVM_UHF |
|  | 1 | ... |  |
|  | 2 | ... |  |
|  | 3 |  |  |
|  | 4 |  |  |
|  | 5 |  |  |
|  | 6 |  |  |
|  | 7 |  |  |
|  | 8 |  |  |
|  | 9 |  |  |
|  | 33 |  |  |
| TID | 0 | ... | NVM_UHF |
|  | 1 | ... |  |
|  | 2 | ... |  |
|  | 3 |  |  |
|  | 4 |  |  |
|  | 5 |  |  |
| USER | 0 | ... | NVM_UHF |
|  | 1 | ... |  |
|  | 2 | ... |  |
|  | 3 |  |  |
|  | 4 |  |  |
|  | 5 |  |  |
|  | 6 |  |  |
|  | 7 |  |  |
|  | 8 |  |  |
|  | 9 |  |  |
|  | 32 | ... | NVM_HF |
|  | ... | ... |  |
|  | 32 + 63*2 + 1 |  |  |
|  | 32 + 80*2 |  |  |
|  | ... | ... |  |
|  | 32 + 98*2 + 1 |  |  |
|  | 254 | ... | NVM_UHF |
|  | 255 |  |  |

MULTI-FREQUENCY TRANSPONDER

TECHNICAL FIELD

The invention relates to the field of multi-frequency transponders, such as radio-frequency identification (RFID) transponders. More specifically, the present invention relates to memory arrangements of multi-frequency transponders. The invention also relates to a corresponding memory access method.

BACKGROUND OF THE INVENTION

Transponders are used for instance in RFID systems. In this description the term transponder is used to describe a device which transmits a signal in response to a received signal. Transponders may operate in one frequency only or they may use multiple frequencies. For example, U.S. Pat. No. 7,091,860 B2 discloses a RFID transponder capable of utilising multiple operating frequencies. An ultra-high frequency (UHF) may be used for data transmission, and another frequency, for instance a high frequency (HF), may be used for field penetration. UHF is the international telecommunication union (ITU) designation for radio frequencies in the range between 300 MHz and 3 GHz, also known as the decimeter band as the wavelengths range from one to ten decimeters. HF is the ITU designation for radio frequencies between 3 and 30 MHz. It is also known as the decameter band or decameter wave as its wavelength range from one to ten decameters (ten to one hundred meters). Different communication protocols are typically applied for data to be sent and/or received in different frequencies. The multi-frequency RFID transponder according to U.S. Pat. No. 7,091,860 B2 may use one common memory for multiple operating frequencies. This solution usually allows minimising the chip area. This approach is also normally used for single protocol RFID tags, which thus contain only one instance of memory.

In the case of multi-frequency transponders, such as dual-frequency transponders, memory requirements are different for each communication protocol. For example, data sent and/or received by using a first communication protocol may need a larger memory space compared to the memory used by a second communication protocol. Also, performance, power consumption and timing requirements for the memories typically vary depending on the communication protocol. Thus, it becomes clear that having only one shared memory in multi-frequency transponders is not an optimal solution. If, on the other hand, two memories are used in a dual-frequency transponder for example, then currently it is not known how to access both memories by using only one communication protocol.

SUMMARY OF THE INVENTION

It is an object of the present invention to overcome the problems identified above related to the memory arrangements in multi-frequency transponders.

According to a first aspect of the invention, there is provided a multi-frequency transponder for communicating at a first frequency according to a first communication protocol and at a second frequency according to a second communication protocol, the second frequency being different from the first frequency, the transponder comprising:
  a first physical memory with a first memory structure for storing a first set of data of the first communication protocol;
  a second physical memory with a second memory structure for storing a second set of data, different from the first set of data, of the second communication protocol; and
  a logic unit for accessing the first and second physical memories, the logic unit comprising a first control unit for handling communications according to the first protocol, and a second control unit for handling communications according to the second protocol,
  wherein the transponder includes
  a mapping memory configured to store a logical memory map of at least one of the first and second physical memories, the logical memory map comprising mapping information for the first or second control unit to access data items in both the first and second physical memories.

The proposed new solution has the advantage that both memories can be accessed for the purpose of reading and/or writing by using only one communication protocol, i.e. one protocol for both memories. Also, the performance of the transponder, e.g. in terms of speed and sensitivity, can be optimised by having two memories because each memory can be optimised for the specific communication protocol. This also means that the overall power consumption of the transponder can be minimised. Furthermore, the proposed transponder allows a maximum memory space for data to be obtained.

According to a second aspect of the invention, there is provided a memory access method for a multi-frequency transponder arranged to communicate at a first frequency according to a first communication protocol and at a second frequency according to a second communication protocol, the second frequency being different from the first frequency, the transponder comprising: a physical memory comprising a first physical memory assigned to the first communication protocol, and a second physical memory assigned to the second communication protocol; a logic unit comprising a first control unit for handling communications according to the first communication protocol, and a second control unit for handling communications according to the second communication protocol, the method comprising:
  receiving a request according to a given communication protocol to access the physical memory of the transponder;
  selecting the first or second control unit, which is responsible for handling communications according to the given communication protocol;
  accessing by the selected control unit a logical memory map of the physical memory assigned to the given communication protocol for accessing the physical memory; and
  accessing the physical memory by the selected control unit through the logical memory map,
  wherein a mapping memory of the transponder is configured to store a logical memory map of at least one of the first and second physical memories, the logical memory map comprising mapping information for the first or second control unit to access data items in both the first and second physical memories.

Other aspects of the invention are recited in the dependent claims attached hereto.

BRIEF DESCRIPTION OF THE DRAWINGS

Other features and advantages of the invention will become apparent from the following description of a nonlimiting exemplary embodiment, with reference to the appended drawings, in which:

FIG. 3 is a diagram showing in more detail the structure of the UHF logical memory map;

DETAILED DESCRIPTION OF EMBODIMENTS OF THE INVENTION

Figure 1:
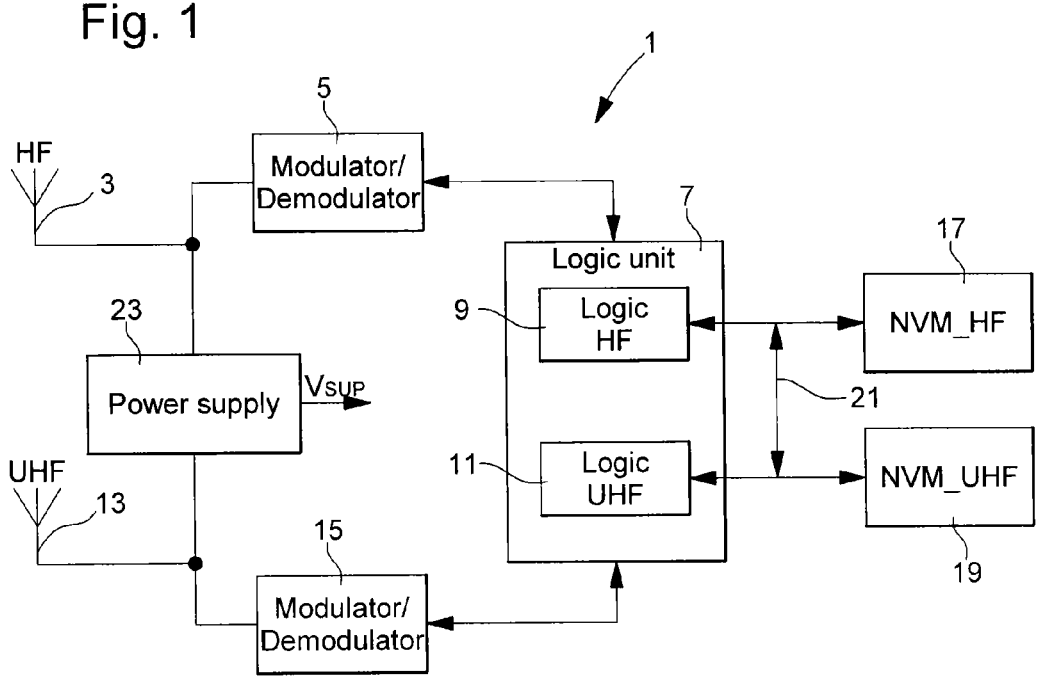
FIG. 1 is a block diagram showing a dual-frequency RFID transponder according to one example of the present invention.

An embodiment of the present invention will now be described in detail with reference to the attached figures. The invention will be described in the context of a dual-frequency RFID transponder. However, the invention is not limited to RFID technology and the transponder according to the present invention could also use more than two frequencies for data communication. Identical or corresponding functional and structural elements which appear in the different drawings are assigned the same reference numerals.

FIG. 1 is a block diagram illustrating an exemplary dual-frequency RFID transponder 1, also known as an RFID tag, according to an embodiment of the present invention. This transponder is arranged to communicate with an RFID interrogator, also known as an RFID reader. The transponder comprises a first antenna 3 arranged to operate at a first frequency. In this example the first frequency is a high frequency, which in this example is about 13.56 MHz. The first antenna 3 is arranged to receive and transmit telecommunication signals according to a first communication protocol. In this example the first communication protocol is a near field communication (NFC) protocol. NFC is a set of ideas and technology that enables devices to establish radio communication with each other by touching them together or bringing them into proximity, typically a distance of 10 cm or less. Each full NFC device can work in three modes: NFC target (acting like a credential), NFC initiator (as a reader) and NFC peer to peer. NFC uses electromagnetic induction between two loop antennas located within each other's near field, effectively forming an air-core transformer. It operates within the globally available and unlicensed radio frequency industrial, scientific and medical (ISM) of 13.56 MHz on ISO/IEC 18000-3 air interface and at rates ranging from 106 kbit/s to 848 kbit/s. NFC standards cover communication protocols and data exchange formats, and are based on existing RFID standards including ISO/IEC 14443 and FeliCa.

The first antenna 3 is connected to a first modulator/demodulator block 5 for modulating the data to be transmitted or for demodulating the data received. The modulator/demodulator block 5 is connected to a logic unit 7, also known as a control unit or decision unit, for processing the received demodulated data or the data to be transmitted. The logic unit 7 comprises a first control unit 9 and a second control unit 11. The first control unit 9 is arranged to process data related to the first communication protocol, while the second control unit 11 is arranged to process data related to a second communication protocol.

As can be seen, the transponder 1 also comprises a second antenna 13 and a second modulator/demodulator 15. The second antenna 13 is arranged to operate at a second frequency, different from the first frequency. In this example the second frequency is an ultra-high frequency and in this example is about 900 MHz. The second antenna 13 is arranged to receive and transmit wireless signals according to the second communication protocol. In this example the second communication protocol is the EPC Class-1 Generation-2 (Gen2). EPC Gen2 is one of the industrial standards for global RFID usage, and a core element of the EPCglobal Network, an architecture of open standards developed by the GS1 EPCglobal community. Currently used EPC Gen2 RFID tags also complies with ISO/IEC 18000-63, formerly ISO/IEC 18000-6 Type C, which is equivalent to EPC Gen2 for the RFID air interface standard. The signals according to this protocol are processed by the second control unit 11. The first control unit 9 is connected to a first non-volatile physical memory (NVM) 17, referred to hereinafter as an NVM_HF, and the second control unit 11 is connected to a to a second NVM physical memory 19, referred to hereinafter as an NVM_UHF. Physical memory is the memory hardware (normally random-access memory) installed in a computing device, such as a transponder. The term is used in contrast to virtual memory. The NVM_HF 17 is arranged to store data related to the first communication protocol, although other types of data may also be stored in that memory. The NVM_UHF 19 is arranged to store data related to the second communication protocol, although other types of data may also be stored in that memory. A memory bus 21 connects the NVM_HF 17 and the NVM_UHF 19. There is further shown a power supply 23 for providing electric power $V_{SUP}$ to the transponder 1. Thus, in this example the transponder can be of an active type, but it could instead be a passive transponder, with no power supply, and by rectifying voltage from signals received by antenna 3 or antenna 13.

The performance (e.g. speed) of the RFID tag depends on the NVM memory, which needs to be accessed. This is due to the memory characteristics (e.g. power consumption, maximum/minimum timings), which are specific for each memory. The NVM_HF is typically larger in terms of number of bits that can be stored than the NVM_UHF. However, the performance of the NVM_HF is worse in both reading and writing data than NVM_UHF, and the power consumption of the NVM_HF is higher than the power consumption of the NVM_UHF. The NFC protocol using the HF and applications using that protocol normally use short-range communications and need maximum available memory space. Therefore, the NVM_HF is the ideal place for storing NFC data, in other words data from HF signals. On the other hand the EPC protocol using the UHF and applications using that protocol normally use long-range communications and require best-in-class sensitivity. Thus, the NVM_UHF is the ideal place for storing EPC data, in other words data from UHF signals. Both memories may also have different word lengths; e.g. 16 bits for EPC/UHF and 32 bits for NFC/HF. Thus, it can be concluded that the memory characteristics and the structure of these memories are different from each other.

The present invention is based on the idea that either one of the control units 9, 11 can access both memories NVM_HF 17, NVM_UHF 19. This is achieved in the present invention by performing memory mapping of both NVM_HF and NVM_UHF to the same memory space of the transponder, referred to as a logical memory map. At least the data address information of the relevant data items in the physical memory are mapped or copied to a transponder mapping memory comprising the logical memory map, which is the memory space seen by the application. Thus, when accessing a data item in the physical memory, the logical memory is first seen by the application, whereby the logical memory acts as a pointer to the relevant data location in the physical memory. The logical memory is related to appropriate RFID protocol standards and conventions. The logical memory maps describe memory structures for each RFID communication protocol. Thus, the logical memory map contains at least address information according to the RFID protocol on how to access specific data entries located in the physical memory.

Figure 2:
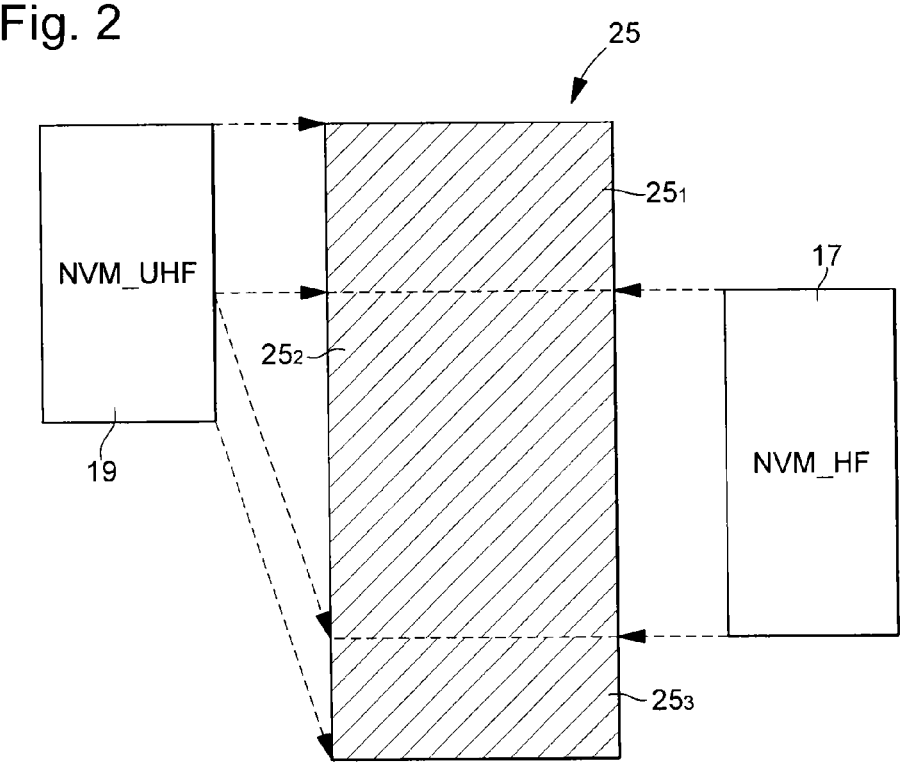
FIG. 2 is a diagram illustrating the principle of doing memory mapping to an UHF logical memory map.

FIG. 2 illustrates the memory mapping principle, when the EPC/UHF logical memory map 25 is used. As can be seen, in this example, the first part $25_1$ of the memory map 25 is used by the NVM_UHF. The second part $25_2$ of the memory map is used by the NVM_HF and the third part $25_3$ of the memory map is again used by the NVM_UHF.

FIG. 3 illustrates the memory mapping in more detail according to this example. The leftmost column indicates the memory bank. According to the EPC protocol which is used in the illustrated example, four memory bank items are defined: RESERVED, EPC, TID (tag ID) and USER. The second column indicates the word address, i.e. the location in the physical memory in order to access a specific data item. The EPC protocol calls data structures as words which are 16 bits long. The column called content indicates the content of the data item. The last column in the right indicates the memory type; in this example either NVM_UHF or NVM_HF. There are many possible ways of doing the memory mapping as long as the memory standards are not violated. In the case of the EPC/UHF memory map 25, the NVM_HF data is mapped typically to the USER memory bank segment of the memory map. In this example, the NVM_HF data occupies one continuous space around the middle of the memory space, while the NVM_UHF data occupies two segments in the memory space, each segment being separated by the NVM_HF data. The mapping of both of the NVM_HF and NVM_UHF data may be done in the continuous memory map space or the data can be interleaved from both physical memories. The performance and timing of reading and writing data in the physical memory depends on the physical memory, where the data is stored and possibly also on the exact location in that memory, where the data is being stored.

Figure 4:
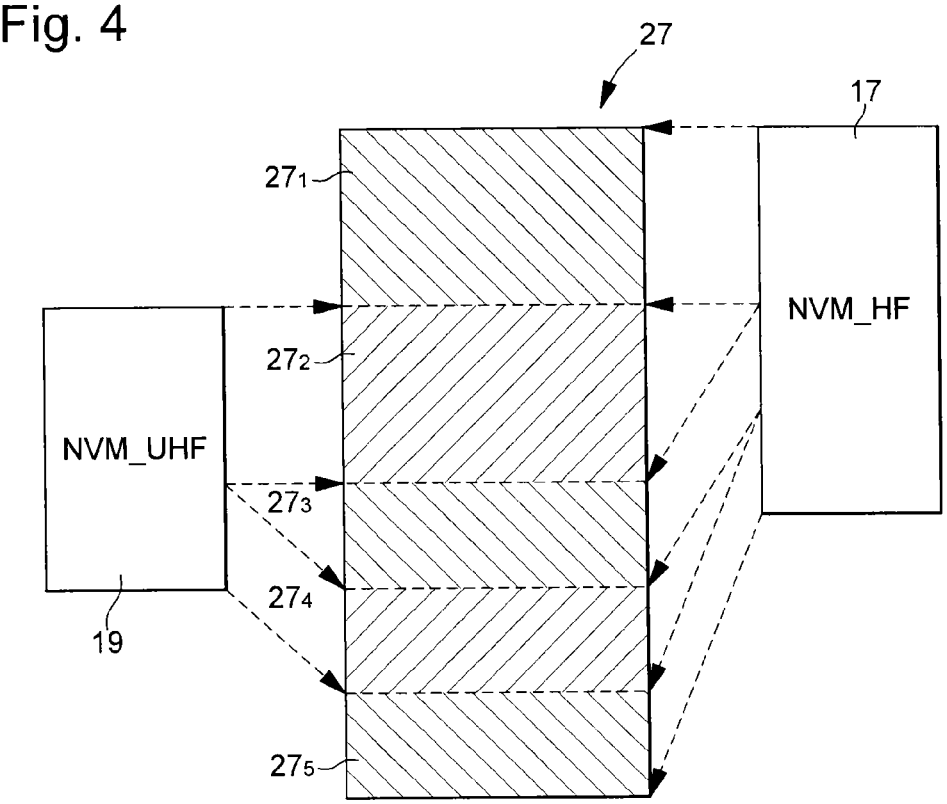
FIG. 4 is a diagram illustrating the principle of doing memory mapping to an HF logical memory map.

FIG. 4 illustrates the memory mapping principle in the connection of the NFC/HF logical memory map 27. As can be seen, in this example the NVM_HF data is stored in the first part $27_1$ of the NFC/HF logical memory map 27, followed by the NVM_UHF data in the second part $27_2$. The third part $27_3$ of the NFC/HF logical memory 27 is again occupied by the NVM_HF data followed again by the NVM_UHF data in the fourth part $27_4$. The last part $27_5$ of the NFC/HF logical memory map 27 is reserved for the NVM_HF data in this example. Thus, in this example the data from the physical memories NVM_HF 17 and NVM_UHF 19 are interleaved in the NFC/HF logical memory map. The NFC/HF logical memory map 27 may be divided into a static memory structure and a dynamic memory structure. In this example, all the UHF data is stored in the dynamic memory structure. Some of the HF is also stored there. In this example, the static memory structure comprises HF data, but does not comprise any UHF data. As for the EPC/UHF logical memory map 25, also for the NFC/HF logical memory map 27 there are numerous possibilities for implementing the memory mapping.

The memory mapping is typically done in a different manner for the two logical memory maps 25, 27 due to different structures of these two logical memory maps. As both of the physical memories 17, 19 are mapped to both of the logical memory maps 25, 27, it is possible to access both the physical memories for the purpose of writing and/or reading data by using only one control unit 9, 11, in other words, by using only one communication protocol or interface. No priority may be given to either interface. Based on the above, a communication device, an RFID reader in this example, in communication with the transponder 1 may only be able to use one communication protocol, but it could still access data in the both physical memories of the transponder 1. Conversely, only one communication protocol may be used to write data to the transponder, and more specifically to any one of the physical memories of the transponder 1. In some implementations the NVM_HF and NVM_UHF cannot be accessed in parallel, but one at a time. Memory access arbitration may be performed on a command basis as they are received over the air interfaces. It is to be noted that the teachings above may be extended to transponders having more than two physical memories. In this case, all or some of the physical memories could be mapped to one or more logical memory maps.

Figure 5:
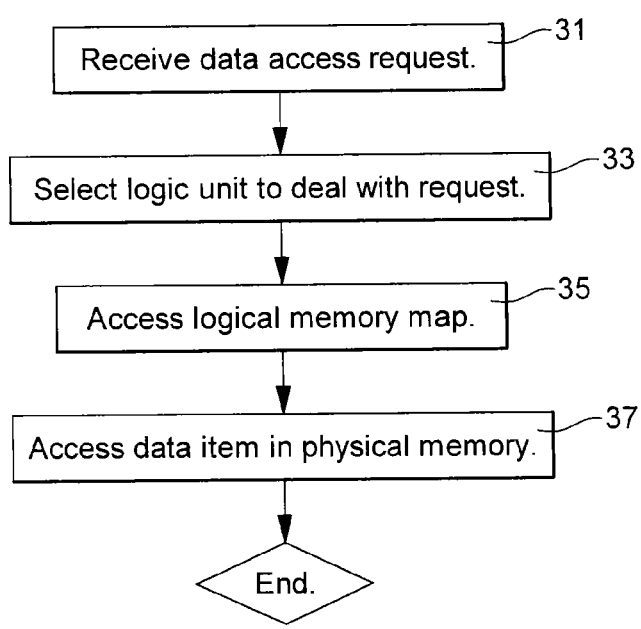
FIG. 5 is a flow chart illustrating an example of a memory access method for a dual-frequency transponder.

The flow chart of FIG. 5 summarises the method of accessing the physical memories 17, 19 of the transponder 1 according to one example. In step 31 the transponder receives a request to access, e.g. to read, a data item located in the physical memory of the transponder. In this example this request is received from an RFID reader. This request is sent by the RFID reader by using one communication protocol only, in this example EPC. In step 33 the logic unit 7 determines which one of the first and second control units 9, 11 is responsible for handling communications according to this particular communication protocol and selects this control unit. In this example, the second control unit 11 is selected for handling this request as this logic unit handles EPC communications. In step 35 the second control unit 11 accesses the logical memory map 25 of its physical memory 19. The logical memory map 25 points the second control unit 11 to read the relevant data from the physical memory 17 and/or the physical memory 19 depending on which physical memory has saved the requested data. In step 37 the data is read from the physical memory. The performance (e.g. speed) of the reading operation depends on the physical memory to be accessed. The memory mapping may be done by the logic unit 7. For example, the NVM_HF 17 may be mapped by the control unit 9, while the NVM_UHF 19 may be mapped by the control unit 11.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

What is claimed is:

1. A multi-frequency transponder for communicating at a first frequency according to a first communication protocol and at a second frequency according to a second communication protocol, the second frequency being different from the first frequency, the transponder comprising:
- a first physical memory with a first memory structure optimized for storing a first set of data of the first communication protocol;
- a second physical memory with a second memory structure optimized for storing a second set of data, different from the first set of data, of the second communication protocol; and
- logic circuitry configured to access the first and second physical memories, the logic circuitry comprising a first control circuit configured to handle communications according to the first protocol, and a second control circuit configured to handle communications according to the second protocol,
- wherein the transponder further includes
- a mapping memory configured to store a logical memory map of at least one of the first and second physical memories, the logical memory map comprising mapping information for the logic circuitry to access data items in both the first and second physical memories.

2. The multi-frequency transponder according to claim 1, wherein the transponder is a radio-frequency identification tag.

3. The multi-frequency transponder according to claim 1, wherein the first frequency is a high frequency and the second frequency is an ultra-high frequency.

4. The multi-frequency transponder according to claim 1, wherein the first communication protocol is a near field communication protocol, while the second communication protocol is an electronic product code protocol.

5. The multi-frequency transponder according to claim 4, wherein the data storage capacity of the first physical memory is larger than the data storage capacity of the second physical memory.

6. The multi-frequency transponder according to claim 4, wherein the logical memory map of the first physical memory comprises a static memory part and a dynamic memory part; and wherein at least some of the storage space of the dynamic memory part is configured for storing data items of the second physical memory.

7. The multi-frequency transponder according to claim 4, wherein the logical memory map of the second physical memory comprises the following memory bank items: "reserved", "EPC", "TID" and "user"; and wherein at least some of the storage space of the memory bank "user" is configured for storing data items of the first physical memory.

8. The multi-frequency transponder according to claim 1, wherein the logical memory map of the first physical memory comprises mapping information for the first control circuit to access data items in both the first and second physical memories, and the logical memory map of the second physical memory comprises mapping information for the second control circuit to access data items in both the first and second physical memories.

9. The multi-frequency transponder according to claim 1, wherein the transponder further comprises a memory bus for data communication between the first and second physical memories.

10. The multi-frequency transponder according to claim 1, wherein the transponder further comprises a power supply.

11. The multi-frequency transponder according to claim 1, wherein the information comprises data in the first and second physical memories, and wherein the data in the first physical memory occupies one continuous space in the logical memory map, while the data in the second physical memory occupies another continuous space in the logical memory map.

12. The multi-frequency transponder according to claim 1, wherein the information comprises data from the first and second physical memories, and wherein the data in the first and second physical memories are interleaved in the logical memory map.

13. The multi-frequency transponder according to claim 1, wherein accessing comprises reading and/or writing data.

14. A memory access method for a multi-frequency transponder arranged to communicate at a first frequency according to a first communication protocol and at a second frequency according to a second communication protocol, the second frequency being different from the first frequency, the transponder including a physical memory comprising a first physical memory assigned and optimized to the first communication protocol, and a second physical memory assigned and optimized to the second communication protocol, logic circuitry comprising a first control circuit configured to handle communications according to the first communication protocol, and a second control circuit configured to handle communications according to the second communication protocol, the method comprising:
- receiving a request according to a given communication protocol to access the physical memory of the transponder;
- selecting the first or second control circuit, which is responsible for handling communications according to the given communication protocol;
- accessing by the selected control circuit a logical memory map of the physical memory assigned to the given communication protocol for accessing the physical memory; and
- accessing the physical memory by the selected control circuit through the logical memory map,
- wherein a mapping memory of the transponder is configured to store a logical memory map of at least one of the first and second physical memories, the logical memory map comprising mapping information for the logic circuitry to access data items in both the first and second physical memories.

15. The method according to claim 14, further comprising, before accessing the logical memory map, the logic circuitry is configured to perform a memory mapping of the first physical memory to a corresponding logical memory map, and of the second physical memory to a corresponding logical memory map, whereby at least some data from the physical memories are copied to the logical memory maps for enabling the physical memories to be accessed through the logical memory maps.

16. A multi-frequency transponder for communicating at a first frequency according to a first communication protocol, which is a near field communication protocol, and at a second frequency according to a second communication protocol, which is an electronic product code protocol, the second frequency being different from the first frequency, the transponder comprising:
- a first physical memory with a first memory structure optimized for storing a first set of data of the first communication protocol;
- a second physical memory with a second memory structure optimized for storing a second set of data, different from the first set of data, of the second communication protocol; and logic circuitry configured to access the first and second physical memories, the logic circuitry comprising a first control circuit configured to handle communications according to the first protocol, and a second control circuit configured to handle communications according to the second protocol, wherein the transponder further includes a mapping memory configured to store a logical memory map of at least one of the first and second physical memories, the logical memory map comprising mapping information for the logic circuitry to access data items in both the first and second physical memories.

* * * * *